United States Patent
Zhang et al.

(10) Patent No.: US 9,054,377 B2
(45) Date of Patent: Jun. 9, 2015

(54) CATHODE COMPOSITION FOR LITHIUM ION BATTERY AND METHOD FOR FABRICATING THE SAME

(75) Inventors: Hao-Xu Zhang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 583 days.

(21) Appl. No.: 12/538,999

(22) Filed: Aug. 11, 2009

(65) Prior Publication Data

US 2010/0173203 A1 Jul. 8, 2010

(30) Foreign Application Priority Data

Jan. 7, 2009 (CN) .......................... 2009 1 0104953

(51) Int. Cl.
| | |
|---|---|
| H01M 4/88 | (2006.01) |
| H01M 4/02 | (2006.01) |
| H01M 4/13 | (2010.01) |
| H01M 4/58 | (2010.01) |
| H01M 4/485 | (2010.01) |
| H01M 4/36 | (2006.01) |
| H01M 4/38 | (2006.01) |
| H01M 10/0525 | (2010.01) |

(52) U.S. Cl.
CPC .............. *H01M 4/485* (2013.01); *H01M 4/366* (2013.01); *H01M 4/38* (2013.01); *H01M 4/58* (2013.01); *H01M 10/0525* (2013.01); *H01M 2004/021* (2013.01); *Y02E 60/122* (2013.01)

(58) Field of Classification Search
None
See application file for complete search history.

(56) References Cited

U.S. PATENT DOCUMENTS

| 7,390,473 B1* | 6/2008 | Singhal et al. ................. 423/306 |
| 2005/0164085 A1 | 7/2005 | Bofinger et al. |
| 2005/0164090 A1* | 7/2005 | Kim et al. ....................... 429/232 |
| 2006/0194097 A1* | 8/2006 | Kim et al. ......................... 429/44 |
| 2008/0118834 A1* | 5/2008 | Yew et al. ...................... 429/217 |

FOREIGN PATENT DOCUMENTS

| CN | 101188287 A | 5/2008 |
| CN | 101202341 | 6/2008 |
| CN | 101210119 A | 7/2008 |
| CN | 200610011611.1 | 8/2008 |
| JP | 2005-216855 | 8/2005 |

OTHER PUBLICATIONS

Daniels, Materials and Procesing for Lithium-Ion Batteries, 43-48 JoM 60:9 (2008).*
Thorton et al, Nanotechnology for Fuel Cells and Batteries, NSF Workshop (Jun. 2007).*
Green Light, Flight (2005).*
Lou et al, Preparation of SnO2/Carbon Composite Hollow Spheres and Their Lithium Storage Properties, 6562-66 Chem. Mater. 20 (2008).*
J. Wolfenstine et al., "Nano-scale Cu6Sn5 anodes", JPS109 pp. 230-233 2002.

(Continued)

*Primary Examiner* — Yoshitoshi Takeuchi
(74) *Attorney, Agent, or Firm* — Novak Druce Connolly Bove + Quigg LLP

(57) ABSTRACT

A cathode composition of lithium ion battery includes a number of nanoparticles and coating material coating outer surfaces of the nanoparticles.

6 Claims, 3 Drawing Sheets

(56) References Cited

OTHER PUBLICATIONS

N. Jayaprakash A N, Kalaiselvi A C, H. Doh, "Synthesis and electrochemical evaluation of carbon coated Cu6Sn5 alloy-graphite composite lithium battery anodes", J Appl Electrochem 37 pp. 567-573 2007.

Thierry Cassagneau and Janos H. Fendler, "Preparation and Layer-by-Layer Self-Assembly of Silver Nanoparticles Capped by Graphite Oxide Nanosheets" JPCB103 pp. 1789-1793 1999.

Lou Xiongwei et al.; "Preparation of SnO2/carbon composite hollow spheres and their lithium storage properties"; Chemistry of Materials, vol. 20, No. 20, p. 6562-6566, Oct. 28, 2008.

\* cited by examiner

US 9,054,377 B2

CATHODE COMPOSITION FOR LITHIUM ION BATTERY AND METHOD FOR FABRICATING THE SAME

BACKGROUND

1. Technical Field

The present disclosure relates to a cathode composition of a lithium ion battery and a method for fabricating the same.

2. Description of the Related Art

In recent years, lithium ion batteries have been of great use in electric vehicles, hybrid electric vehicles, dispersed energy storage systems, and other things requiring batteries. The cost, safety, environmental friendliness, and long operational life of cathode compositions are a major concern for the application of large-scale lithium-ion batteries. Lithium ion batteries typically include an anode, an electrode, and a cathode that contains lithium in the form of a lithium-transition metal oxide. Examples of transition metal oxides that have typically been used include cobalt dioxide, and nickel dioxide. However, none of these materials exhibit an optimal combination of low manufacturing cost and good capacity retention after repeated charge-discharge cycling.

What is needed, therefore, is a cathode composition of a lithium ion battery and a method for fabricating the same, which can overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
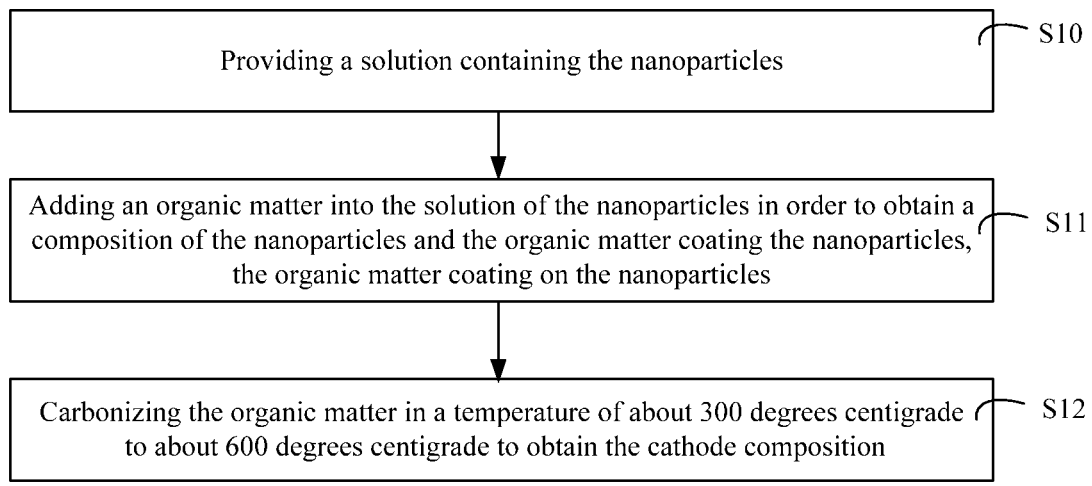
FIG. 1 is a flow chart of one embodiment of a method for fabricating the cathode composition of the lithium ion battery.

An embodiment of a cathode composition for a lithium (Li) ion battery includes a number of nanoparticles and a material coating outer surfaces of the nanoparticles.

The nanoparticles may be of a material having a capability of intercalating Li. The nanoparticles may be alloy nanoparticles, metal-oxide nanoparticles, graphite oxide composite nanoparticles, or their combinations. The alloy nanoparticle may be $Cu_6Sn_5$, $Mg_2Sn$, $CoSn$, $NiSn_4$, $CeSn_3$, or their combinations. The metal-oxide nanoparticle may be $SnO_2$, $Fe_2O_3$, $CoO$, $CuO$, $NiO_2$, or their combinations. The graphite oxide composite nanoparticles may be composites of the graphite oxide and metal-oxide nanoparticles as described above. The nanoparticles have diameters of about 1 nanometer (nm) to about 50 nm. In the present embodiment, the nanoparticles are $SnO_2$ and have diameters of about 2 nm to about 3 nm.

The coating material includes carbon and oxygen. The coating material coats over all the outer surfaces of the nanoparticles and forms a net. The coating material is connected to the nanoparticles via chemical bond. The mass percent of the coating material in the cathode composition may be in a range of about 30 percent to about 90 percent. If the mass percent of the coating material is too low, such as less than 30 percent, the nanoparticles cannot be fully coated by the coating material or the coating layer of the coating material may be too thin, such that the coating layer of the nanoparticles may be destroyed during carbonizing. If the mass percent of the coating material is too high, such as greater than 90 percent, the lithium-ion-storage capacity and conductivity of the cathode composition may be decreased because carbon has a low lithium-ion-storage capacity and oxygen has low conductivity. In the present embodiment, the mass percent of the coating material in the cathode composition ranges from about 65 percent to about 70 percent.

In the present embodiment, the nanoparticles of $SnO_2$ are coated with the coating material having the carbon and the oxygen, thereby forming the cathode composition of $C_3OSn_{0.16}$. Since oxygen has a high capacity for lithium-ion-storage, it is advantageous for improving the discharging capacity of the cathode composition. Furthermore, because of the effect of coating the nanoparticles with the coating material, the structural strain on the oxygen of the cathode composition, which is generated during intercalation and de-intercalation of lithium ions, is lessened. Therefore, the charge/discharge cycle of the cathode composition may be further improved.

Moreover, the cathode composition of the lithium ion battery can be further disposed on a surface of a current-collector. The cathode composition can be directly coated onto the surface of the current-collector, and then sintered to be tightly bonded to the current-collector. The current-collector can be a metal plate/foil. In the present embodiment, the current-collector is a copper foil.

Depending on the embodiment, certain of the steps described in the methods below may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps. Referring to FIG. 1, one embodiment of a method of fabricating the cathode composition of the lithium ion battery includes:

step S10: providing a solution containing the nanoparticles;

step S11: adding an organic matter into the solution of the nanoparticles to obtain a composition of the nanoparticles and the organic matter coating the nanoparticles; and step S12: carbonizing the organic matter in a temperature of about 300 degrees centigrade to about 600 degrees centigrade to obtain the cathode composition.

In the step S10, the nanoparticles can be made by different methods depending on whether alloy nanoparticles, metal-oxide nanoparticles, metal hydroxides nanoparticles, or graphite oxide composite nanoparticles are used.

Figure 2:
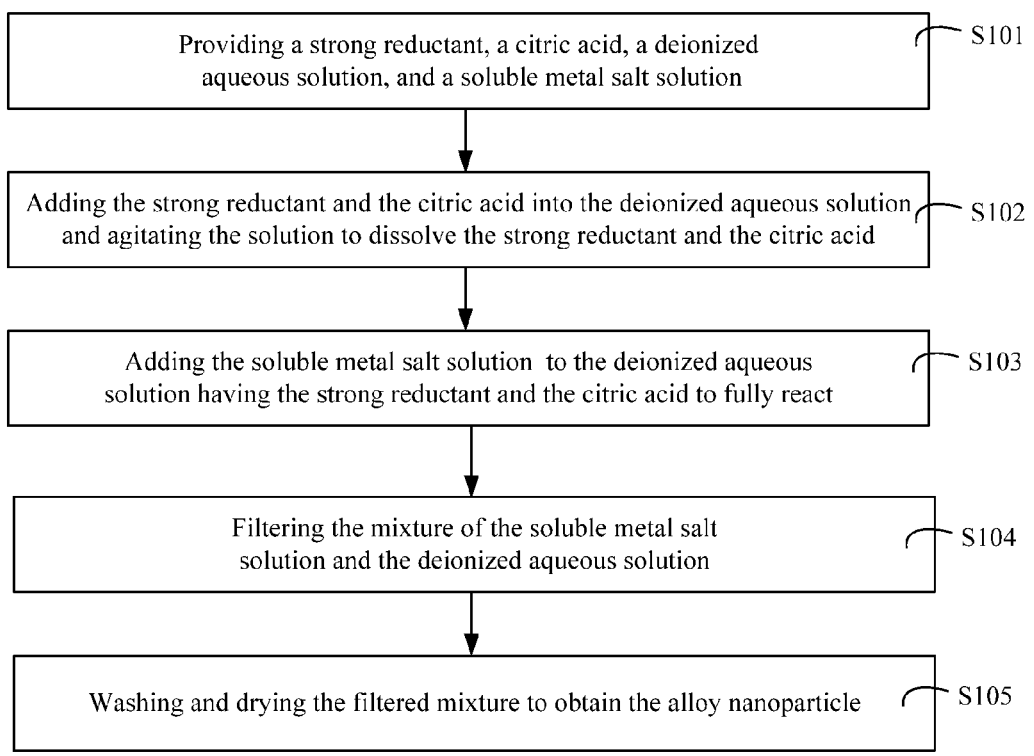
FIG. 2 is a flow chart of one embodiment of a method for fabricating the alloy nanoparticle used in the cathode composition of FIG. 1.

Referring to FIG. 2, one embodiment of a method of fabricating the alloy nanoparticle employs a liquid-phase reduction method. The method includes:

step S101: providing a strong reductant, a citric acid, a deionized aqueous solution, and a soluble metal salt solution;

step S102: adding the strong reductant and the citric acid into the deionized aqueous solution and agitating the solution to dissolve the strong reductant and the citric acid;

step S103: adding the soluble metal salt solution to the deionized aqueous solution having the strong reductant and the citric acid to fully react;

step S104: filtering the mixture of the soluble salt solution and the deionized aqueous solution; and step S105: washing and drying the filtered mixture to obtain the alloy nanoparticle.

The strong reductant may be $NaBH_4$, $KBH_4$, or their combinations. The soluble metal salt may be $CuCl_2$, $SnCl_4$, $CoCl_2$, $NiCl_2$, $MgCl_2$, or their combinations.

One embodiment of a method for fabricating the metal oxide nanoparticles or the metal hydroxide nanoparticles includes:

step S301: providing a soluble metal salt and a deionized aqueous solution; and step S302: dissolving the soluble metal salt in the deionized aqueous solution at a predetermined temperature to obtain a solution having the metal oxide nanoparticle or the metal hydroxide nanoparticles.

The metal of the soluble salt may be tin, iron, copper, cobalt, nickel, or their combinations. The nanoparticles have diameters of about 1 nm to about 50 nm. During fabricating the metal oxide nanoparticle, a nickel hydroxide can be added to the solution for fabricating nanoparticles with a smaller diameter. Understandably, the nickel hydroxide can be replaced with soluble nickel salt, or soluble hydroxide, such as nickel acetate, sodium hydroxide. In the present embodiment, the $SnCl_2.2H_2O$, nickel acetate, and sodium hydroxide are added to the deionized aqueous solution and are dissolved at room temperature. Thus, a nickel dioxide nanoparticle that has a diameter of about 2 nm to about 3 nm can be fabricated.

Figure 3:
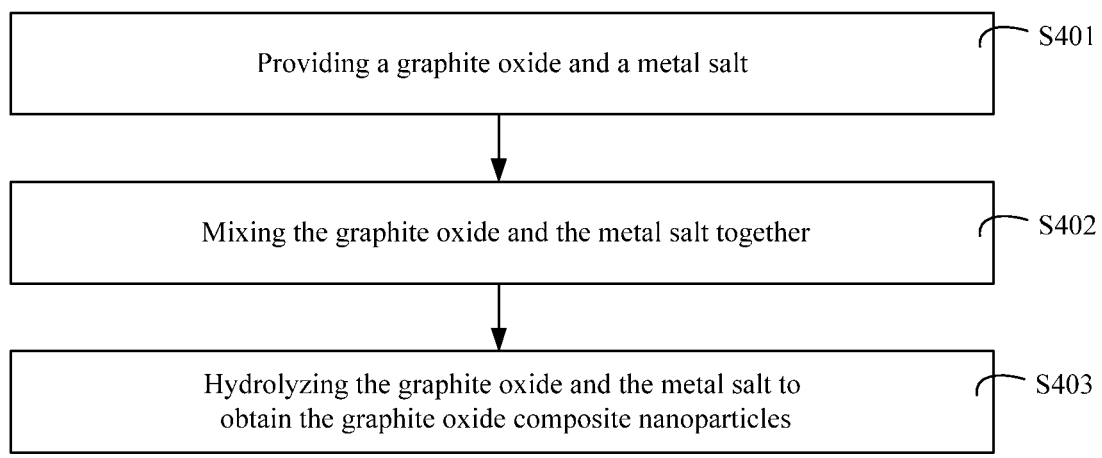
FIG. 3 is a flow chart of one embodiment of a method for fabricating the graphite oxide composite nanoparticles used in the cathode composition of FIG. 1.

Referring to FIG. 3, one embodiment of a method of fabricating the graphite oxide composite nanoparticles includes:

step S401: providing a graphite oxide and a metal salt;

step S402: mixing the graphite oxide and the metal salt together; and step S403: hydrolyzing the graphite oxide and the metal salt to obtain the graphite oxide composite nanoparticles. The hydrolysis can be carried out at less than 0 degrees centigrade. Furthermore, an acid can be added into the mixture of the graphite oxide and the metal salt to decrease the reaction rate thereof, which is advantageous to fabricate the graphite oxide composite nanoparticles.

In step S11, the solution is heated to about 140 degrees centigrade to about 200 degrees centigrade and kept at that temperature for about 3 hours to about 8 hours so that the organic matter can be shrunk and coats on the nanoparticles. Then, the solution should be filtered, thereby obtaining the composition of the nanoparticles and the organic matter. Since the organic molecules of the organic matter is a net and the organic matter forms micelle nanoparticles during the dissolving step, the nanoparticles can be coated with the organic matter. The organic matter can be a phenolic resin, a furfural resin, a saccharon resin, an epoxy resin, a sucrose, a starch, and their combinations. In the present embodiment, the organic matter is sucrose, and the solution is heated to 180 degrees centigrade and kept at that temperature for about 4 hours. As described above, the solution includes the SnCl2.2H2O, the nickel acetate, and sodium hydroxide. Tin oxide nanoparticles are formed from dehydrating. Therefore, a tin oxide nanoparticle coated with the sucrose is obtained.

In step S12, the tin oxide nanoparticles coated with the sucrose are heated to about 300 degrees centigrade to about 600 degrees centigrade and kept at that temperature for about 0.5 hours to about 2 hours in a protective gas environment. The protective gas may be nitrogen or an inert gas. The heating temperature must be greater than or equal to 300 degrees centigrade and less than or equal to 600 degrees centigrade. If the temperature is less than 300 degrees centigrade, the content of the carbonized organic matter will be too low, resulting in poor conductivity of the cathode composition. However, if the temperature is greater than 600 degrees centigrade, the organic matter may be completely carbonized into carbon, which results in poor lithium-ion-storage capacity because no oxygen will be remaining in the cathode composition. In the present embodiment, the protecting gas is nitrogen and the sucrose coated tin oxide nanoparticle is heated to about 380 degrees centigrade and held there for about 1 hour.

Since oxygen has better lithium-ion-storage capacity than other elements, the cathode composition will have better lithium-ion-storage capacity. Since the molar ration of the metal and the oxygen is high, the cathode composite can obtain a better lithium-ion-storage capacity. And, carbon distributes in the cathode composite in network, thereby preventing from aggregating. Furthermore, the carbonizing temperature of the organic matter is lower because the amount of the metal can be decreased, thus the manufacturing cost is further decreased.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A cathode composition for a lithium ion battery, consisting of:
a plurality of nanoparticles and coating material coating outer surfaces of the nanoparticles, wherein the coating material is an organic material consisting of carbon and oxygen, the cathode composition of the lithium ion battery is $C_3OSn_{0.16}$.

2. The cathode composition as claimed in claim 1, wherein the coating material coats on the nanoparticles and forms a net.

3. The cathode composition as claimed in claim 1, wherein the nanoparticles are connected to the coating material via chemical bond.

4. The cathode composition as claimed in claim 1, wherein the nanoparticles are $SnO_2$.

5. The cathode composition as claimed in claim 1, wherein the nanoparticles have diameters of about 1 nm to about 50 nm.

6. The cathode composition as claimed in claim 1, wherein the cathode composition is disposed on a surface of a current-collector.

* * * * *